(12) United States Patent
Sano et al.

(10) Patent No.: US 8,717,684 B2
(45) Date of Patent: May 6, 2014

(54) OPTICAL SYSTEM AND OPTICAL EQUIPMENT INCLUDING THE SAME

(75) Inventors: Daisuke Sano, Utsunomiya (JP); Kazuhiko Momoki, Koshigaya (JP); Takeharu Okuno, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 12/779,596

(22) Filed: May 13, 2010

(65) Prior Publication Data
US 2010/0290133 A1 Nov. 18, 2010

(30) Foreign Application Priority Data
May 13, 2009 (JP) .................................. 2009-116313

(51) Int. Cl.
*G02B 3/02* (2006.01)
*G02B 1/11* (2006.01)
*G02B 27/00* (2006.01)
*G02B 13/18* (2006.01)

(52) U.S. Cl.
CPC .............. *G02B 3/02* (2013.01); *G02B 27/0018* (2013.01); *G02B 13/18* (2013.01); *G02B 1/11* (2013.01)
USPC ............................. 359/718; 359/722; 359/580

(58) Field of Classification Search
CPC ...... G02B 3/02; G02B 27/0018; G02B 13/18; G02B 1/11
USPC .......................................... 359/720, 718, 722
See application file for complete search history.

(56) References Cited

U.S. PATENT DOCUMENTS

| 5,598,205 A * | 1/1997 | Nishioka ........................ 359/720 |
| 7,023,630 B2 | 4/2006 | Saito |
| 7,248,279 B2 * | 7/2007 | Ishihara et al. ............. 359/207.1 |
| 7,256,947 B2 | 8/2007 | Nishimura |
| 7,457,044 B2 * | 11/2008 | Ohzawa et al. ................ 359/671 |
| 7,768,719 B2 * | 8/2010 | Jung et al. ..................... 359/762 |
| 8,009,366 B2 * | 8/2011 | Hirose ........................... 359/671 |
| 2005/0036212 A1 | 2/2005 | Saito |
| 2005/0036215 A1 | 2/2005 | Nishimura |
| 2006/0199040 A1 * | 9/2006 | Yamada et al. ................ 428/701 |

FOREIGN PATENT DOCUMENTS

| JP | 2005-062525 A | 3/2005 |
| JP | 2005-062526 A | 3/2005 |
| JP | 2005-157119 A | 6/2005 |
| JP | 2008-233584 A | 10/2008 |
| JP | 2008-233585 A | 10/2008 |
| JP | 2008-276059 A | 11/2008 |
| WO | WO2008062661 | * 5/2008 ............. G02B 13/04 |

* cited by examiner

*Primary Examiner* — Zachary Wilkes
(74) *Attorney, Agent, or Firm* — Rossi, Kimms & McDowell LLP

(57) ABSTRACT

Provided is an optical system with an excellent anti-reflection effect and ghost suppression effect including an aspherical lens having at least one of an incident surface and an exiting surface of an optical glass formed of an aspherical surface, in which: the aspherical surface includes an anti-reflection structure formed thereon, the anti-reflection structure having an anti-reflection function and including multiple inorganic structural parts finer than a used wavelength; and the aspherical surface has a point that satisfies the following expression: $|(1/Rm-1/Rs)/Rm|>5.0\times10^{-5}$, where Rm denotes a radius of curvature in a meridional direction at an arbitrary point, and Rs denotes a radius of curvature in a sagittal direction at the arbitrary point.

9 Claims, 4 Drawing Sheets

OPTICAL SYSTEM AND OPTICAL EQUIPMENT INCLUDING THE SAME

BACKGROUND OF THE INVENTION

1. Field of the Invention

The present invention relates to an optical system which effectively performs anti-reflection on a lens surface while keeping a high optical performance, and is suitable for an optical equipment such as a video camera or a projector.

2. Description of the Related Art

There is a demand that an optical system used for an optical equipment such as a camera or a projector provide a high optical performance so as to meet the high performance of the optical equipment. In order to obtain the optical system with the higher optical performance, it is effective to use an aspherical lens in addition to a spherical lens. When reflected light from the lens surface enters an imaging plane to serve as ghost light, the image quality is largely deteriorated. Therefore, in order to obtain the optical system with the high optical performance, it is effective to provide an anti-reflection structure for preventing reflection on the lens surface.

An anti-reflection structure in which multiple structural parts are arranged at pitches shorter than the wavelength of visual light has been known as the anti-reflection structure low in reflectance in a wavelength region having a wide visible range and excellent in incident angle characteristic. There has been known an optical system in which such an anti-reflection structure is disposed on the lens surface to effectively reduce the reflected light (Japanese Patent Application Laid-Open No. 2005-62525 and Japanese Patent Application Laid-Open No. 2005-62526). Japanese Patent Application Laid-Open No. 2005-62525 discloses an optical system using an optical element in which a fine periodical structure having a period smaller than the wavelength of the incident light is formed on the aspherical surface. Further, Japanese Patent Application Laid-Open No. 2005-62526 discloses an optical system using an optical element with a fine periodical structure including a resin layer different in linear expansion coefficient from that of a base member in which the surface of the resin layer has a period smaller than the wavelength of the incident light.

When the aspherical lens is used as a part of the optical system, the correction of aberration is excellently performed, and the high optical performance is easily obtained over the entire screen. However, when the radius of curvature of the aspherical surface becomes smaller, an incident angle range of a light beam to the aspherical surface is enlarged, a large amount of unnecessary reflected light is generated from the aspherical surface, and the unnecessary reflected light enters the imaging plane, which causes flare and ghost to frequently occur. In particular, when the angle of field of the optical system increases, this tendency increases. The flare and ghost that occur on the aspherical surface are liable to be heteromorphous as compared with those occurring on the spherical surface. Because the occurrence of the heteromorphous ghost image is very conspicuous, such a ghost image is not preferable.

On the contrary, as compared with the anti-reflection structure formed of a thin film, the anti-reflection structure in which multiple structural parts each having a concavo-convex shape finer than the used wavelength are arranged on the lens surface provides the excellent anti-reflection effect in a wide incident angle range. However, in order to obtain the anti-reflection function (wavelength band characteristic) capable of reducing the reflected light from the aspherical surface in a wide wavelength range while enhancing the optical performance of the optical system by using the aspherical lens, it is important to appropriately set the shape of the aspherical surface that provides the anti-reflection structure.

In particular, in order to form the anti-reflection structure formed of multiple fine structural parts in the aspherical surface so as to effectively perform anti-reflection while ensuring the high optical performance, it is important to appropriately set the shape of the aspherical surface that provides the anti-reflection structure, and the applied portion thereof in the optical system. When those requirements are inappropriate, the excellent anti-reflection effect is not obtained, the heteromorphous ghost frequently occurs, and the optical system with a high optical performance is difficult to obtain.

SUMMARY OF THE INVENTION

It is an object of the present invention to provide an optical system which has an excellent anti-reflection effect, is small in occurrence of ghost, and easily obtains a high optical performance.

In order to achieve the above-mentioned object, according to an aspect of the present invention, there is provided an optical system, including an aspherical lens having at least one of an incident surface and an exit surface of an optical glass formed of an aspherical surface, in which: the aspherical surface includes an anti-reflection structure formed thereon, the anti-reflection structure including multiple structural parts made of an inorganic material and finer than a used wavelength; and the aspherical surface has a point that satisfies the following expression:

$$|(1/Rm - 1/Rs)/Rm| > 5.0 \times 10^{-5},$$

where $Rm$ denotes a radius of curvature in a meridional direction at an arbitrary point, and $Rs$ denotes a radius of curvature in a sagittal direction at the arbitrary point.

Note that, in the optical system, the aspherical surface may have a maximum half aperture angle equal to or higher than 30 degrees.

The optical system may further include an aperture stop, and the aspherical surface may be located on an object side of the aperture stop.

Further, the aspherical surface may have a point that satisfies the following expression:

$$|Rm/Rs| > 1.05,$$

where $Rm$ denotes the radius of curvature in the meridional direction at the arbitrary point, and $Rs$ denotes the radius of curvature in the sagittal direction at the arbitrary point.

Further, in order to achieve the above-mentioned object, according to another aspect of the present invention, there is provided an image pickup device including: the above-mentioned optical system; and an image pickup element that receives light of an image formed by the optical system.

In the image pickup device, the following expression may be satisfied:

$$80 \text{ degrees} < 2\omega,$$

where $2\omega$ denotes an imaging angle of field of the optical system.

Further, in order to achieve the above-mentioned object, according to a further aspect of the present invention, there is provided an optical device, including the above-mentioned optical system.

According to the present invention, the optical system that has the excellent anti-reflection effect, reduces the occurrence of flare and ghost, and has the high optical performance can be obtained.

Further features of the present invention become apparent from the following description of exemplary embodiments with reference to the attached drawings.

DESCRIPTION OF THE EMBODIMENTS

Hereinafter, exemplary embodiments of the present invention are described in detail with reference to the accompanying drawings and numerical embodiments. For description, a visible range (400 to 700 nm in wavelength) is exemplified as a region of a used wavelength. However, the present invention is not limited to this wavelength region, but 350 to 1000 nm in wavelength may be applied.

An optical system according to the present invention includes an image pickup optical system and a projection optical system with a single focal length, and a zoom lens. The optical system according to the present invention includes, in an optical path, an aspherical lens having at least one of an incident surface and an exiting surface of an optical glass formed of an aspherical surface (a lens surface having an aspherical shape). On the aspherical surface is formed an anti-reflection structure with an anti-reflection function which is made of an inorganic material and includes multiple structural parts finer than the used wavelength (fine concavo-convex structure).

First Embodiment

Figure 1:
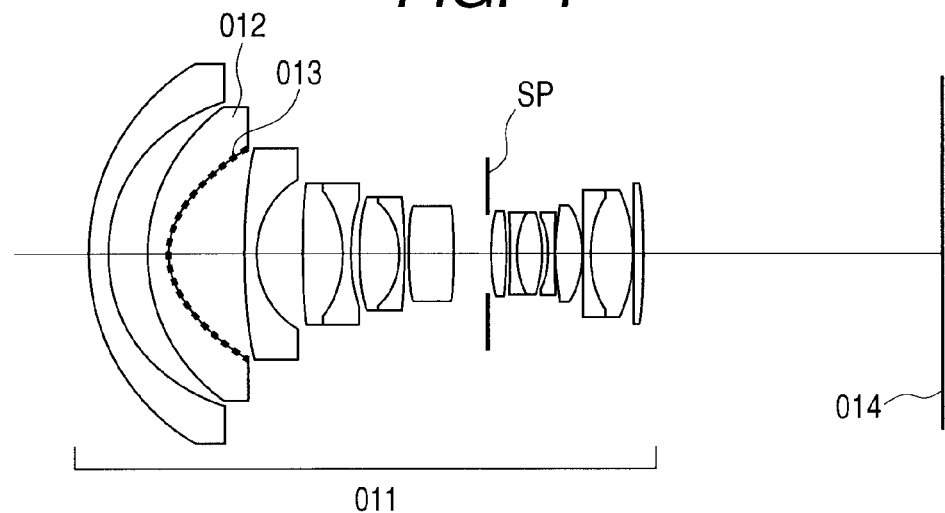
FIG. 1 is a cross-sectional view of lenses of an optical system according to a first embodiment of the present invention.

FIG. 1 is a cross-sectional view of lenses of an optical system according to a first embodiment of the present invention. When the optical system of the first embodiment is used as an image pickup optical system, a left hand in the figure is an object side, and a right hand is an image side. On the other hand, the optical system may be used for a projection optical system such as a projector. In this case, the left hand is a screen, and the right hand is an image to be projected. In this embodiment, an example in which the optical system is used as the image pickup optical system is described below.

Referring to FIG. 1, an image pickup optical system 011 is of a retrofocus type. An aspherical lens 012 includes a lens surface of an aspherical shape. The aspherical lens 012 includes an aspherical surface 013. An imaging plane is represented by 014. An aperture stop is represented by SP. Table 1 shows a detailed numerical embodiment of the image pickup optical system according to the first embodiment. The aspherical lens 012 according to this embodiment is a second lens from the object side, and the lens surface 013 on the image side is of the aspherical shape. On the aspherical surface 013 is formed an anti-reflection structure made of an inorganic material and having structural parts (fine structure) finer than the used wavelength (400 to 700 nm in wavelength).

A first numerical embodiment according to the first embodiment of the present invention is described below. In the numerical embodiment, i is the order of optical surfaces from the object side, ri is a radius of curvature of an i-th optical surface (i-th surface), di is an interval between the i-th surface and an (i+1)-th surface, and ndi and vdi are refractive index and Abbe number of a material of an i-th optical member to a d-line, respectively. The aspherical shape is represented by the following Expression (1) when it is assumed that a radius of curvature of the central portion of the lens surface is R, the optical axial direction is an X-axis, a direction perpendicular to the optical axis is a Y-axis, and B, C, D, E, F, G, and H are aspherical coefficients, respectively.

$$X = \frac{Y^2/R}{1+\sqrt{1-(K+1)(Y/R)^2}} + B \cdot Y^4 + C \cdot Y^6 + D \cdot Y^8 + E \cdot Y^{10} + F \cdot Y^{12} + G \cdot Y^{14} + H \cdot Y^{16} \quad (1)$$

In this embodiment, it is assumed that a radius of curvature of an arbitrary point on the aspherical surface 013 in the meridional direction is Rm, and a radius of curvature in the sagittal direction is Rs. In this case, the following Expression (2) is satisfied.

$$|(1/Rm - 1/Rs)/Rm| > 5.0 \times 10^{-5} (\text{mm}^{-2}) \quad (2)$$

Figure 2:
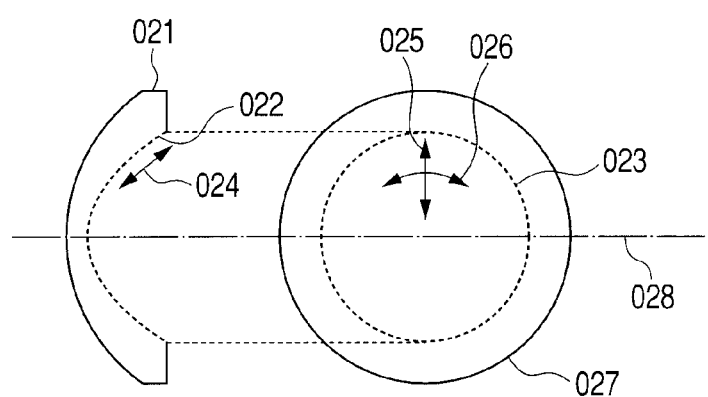
FIG. 2 is a schematic view of an aspherical lens in a meridional direction and a sagittal direction.

FIG. 2 illustrates a schematic view of the aspherical lens according to this embodiment. Referring to FIG. 2, an aspherical lens is represented by 021, a cross section of an aspherical surface of the aspherical lens 021 is represented by 022, and a front view of the aspherical surface of the aspherical lens 021 viewed from the aspherical surface 022 side is represented by 023. A meridional direction of the aspherical surface 022 is represented by 024, a meridional direction of the aspherical surface 023 is represented by 025, a sagittal direction of the aspherical surface 023 is represented by 026, a contour of the aspherical lens 021 is represented by 027, and an optical axis of the aspherical lens 021 is represented by 028. The meridional direction 023 corresponds to a radial direction of the aspherical lens 021, and the sagittal direction 026 corresponds to a concentric direction of the aspherical lens 021. Because the radii of curvature Rm and Rs used in Expression (2) are different depending on locations of the aspherical surface, those radii of curvature need to be obtained at respective positions.

Figure 9:
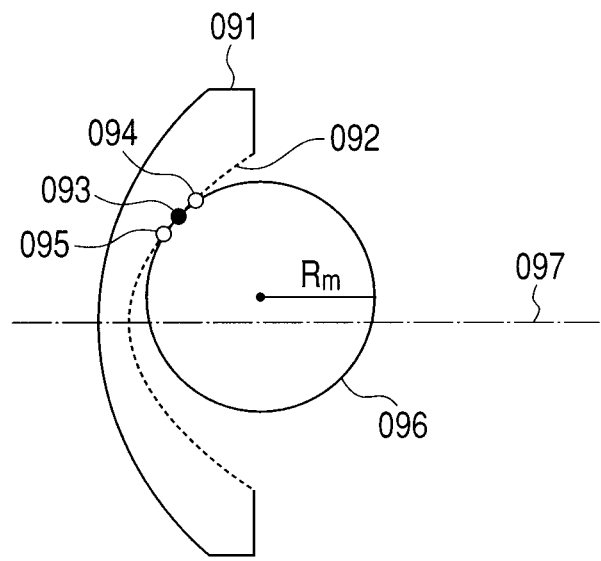
FIG. 9 is a conceptual view for obtaining a radius of curvature Rm in the meridional direction of the aspherical surface.

FIG. 9 is a conceptual view for obtaining the radius of curvature Rm of the aspherical surface 022. In the figure, an aspherical lens including an aspherical surface is represented by 091, a cross section of the aspherical surface is represented by 092, and a point at which the curvature on the aspherical surface 092 is obtained is represented by 093. Points between which the point 093 is sandwiched are represented by reference numerals 094 and 095, a circle inscribed in the aspherical surface 092 is represented by 096, and an optical axis of the aspherical lens 091 is represented by 097. In order to obtain the radius of curvature Rm, the two points 094 and 095 close to the point 093 at which the curvature is to be obtained are first obtained. All of those three points 093, 094, and 095 exist on the aspherical surface 092 of a cross section of the aspherical lens 091 taken along a surface including the optical axis 097. An inscribed circle 096 passing through those three points 093, 094, and 095 is drawn. The radius of the inscribed circle 096 is a radius of curvature Rm. In order to obtain the strict radius of curvature Rm, an interval between the points 093 and 094 and an interval between the points 093 and 095 need to approach 0 without limit.

Figure 10:
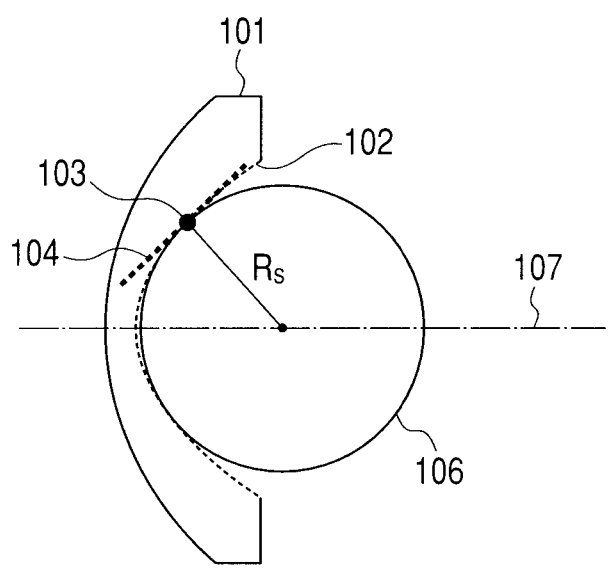
FIG. 10 is a conceptual view for obtaining a radius of curvature Rs in the sagittal direction of the aspherical surface.

FIG. 10 is a conceptual view for obtaining the radius of curvature Rs of the aspherical surface 102. In the figure, an aspherical lens including an aspherical surface is represented by 101, a cross section of the aspherical surface is represented by 102, and a point at which the curvature on the aspherical surface 102 is obtained is represented by 103. A tangent plane tangent to the aspherical surface 102 at the point 103 is represented by 104, a circle inscribed in the aspherical surface 102 is represented by 106, and an optical axis of the aspherical lens 101 is represented by 107. In order to obtain the radius of curvature Rs, the tangent plane 104 tangent to the aspherical surface 102 at the point 103 at which the radius of curvature is to be obtained is first obtained. Then, the inscribed circle 106 inscribed in the tangent plane 104 and having a center on the optical axis 107 is obtained. The radius of curvature of the inscribed circle 106 is Rs.

In the normal spherical lens, the radius of curvature Rm and the radius of curvature Rs coincide with each other at all of positions. However, on the aspherical surface of the aspherical lens, when the aspherical amount increases, a difference between the radius of curvature Rm and the radius of curvature Rs becomes larger, and a value on the left-hand side of Expression (2) becomes larger. When the ghost light occurs on such an aspherical surface, because the degree of divergence or convergence changes depending on a direction of the reflecting surface, the ghost is liable to become a heteromorphous image. The heteromorphous image is conspicuous more than the ghost image occurring on the spherical surface, and therefore such an image is not preferable.

This embodiment is characterized in that the value on the left-hand side of Expression (2) is larger than $5.0 \times 10^{-5}$. The ghost occurring on the aspherical surface that satisfies this condition is liable to be heteromorphous as compared with the spherical surface because the aspherical amount is large. When the anti-reflection structure according to this embodiment is applied to such an aspherical surface, the ghost can be effectively suppressed. When the value on the left-hand side of Expression (2) satisfies the following expression, the ghost is liable to be more heteromorphous, and the ghost can be effectively suppressed by this embodiment.

$$7.0 \times 10^{-5} < |(1/Rm - 1/Rs)/Rm| < 1.0 \times 10^{-4} (mm^{-2}) \qquad (1a)$$

In the aspherical surface 013 of the first embodiment, the value on the left-side of Expression (2) is $3.0 \times 10^{-3}$, which satisfies the condition of Expression (2). For that reason, the ghost occurring on the aspherical surface 013 is liable to become a heteromorphous image, but the ghost can be effectively suppressed with application of the anti-reflection structure of this embodiment.

Figure 3:
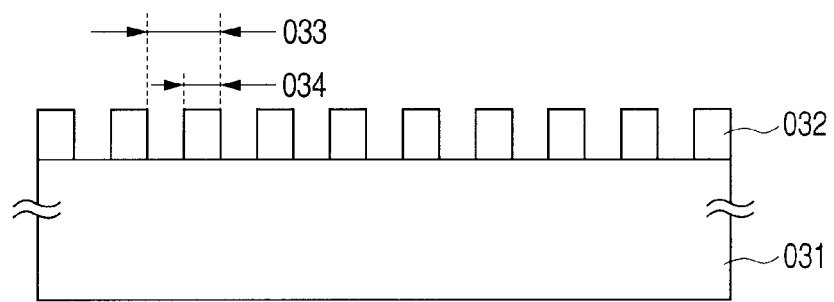
FIG. 3 is a schematic view of an anti-reflection structure with a structure finer than a used wavelength.

This embodiment provides the anti-reflection structure formed of structural parts of a concavo-convex shape having a structure finer than the wavelength (used wavelength) of light entering the aspherical lens 012. FIG. 3 is a schematic view of the anti-reflection structure according to this embodiment. In this figure, a substrate (lens substrate) made of an optical glass is represented by 031, the anti-reflection structure is represented by 032, pitches between structures (between structural parts) of the anti-reflection structure 032 are represented by 033, and the structural parts of the anti-reflection structure 032 is represented by 034.

In the anti-reflection structure 032, the pitches 033 are smaller than the used wavelength (for example, 400 nm to 700 nm in wavelength). It is known that light acts inside such a structure as if the anti-reflection structure 032 is a uniform filme. The inside of the anti-reflection structure 032 exhibits a characteristic conforming to the volume ratio of a material of the structural parts 034. When the configuration of FIG. 3 is exemplified, the equivalent refractive index neff of the anti-reflection structure 032 is simply obtained from Expression (3) by using the refractive index ns of the structural parts 034 and the volume ratio ff of the structural parts 034.

$$neff = ff \cdot ns + (1-ff) \qquad (3)$$

In this expression, the volume ratio ff is obtained by {(structural parts 034)/(pitches 033 between structures)}. When the anti-reflection structure 032 is a composite including air, the equivalent refractive index neff is equivalent to a low refractive index of a filme which is difficult to realize in the conventional thin film material. The anti-reflection film using the filme low in refractive index exhibits a remarkably high anti-reflection performance. When the anti-reflection structure 032 with such a configuration is provided to the aspherical surface 013, the intensity of ghost is highly weakened so as to be obscure. For that reason, when the anti-reflection structure 032 is provided to the aspherical surface that satisfies Expression (2), there is an advantage that the ghost becomes heteromorphous, but obscure as an image.

In this example, for simplification of description, the anti-reflection structure 032 is formed of the structural parts with a periodical structure. However, the anti-reflection structure 032 may be formed of structural parts with a nonperiodical structure when the pitches 032 of the structural parts are equal to or lower than the wavelength of the use light. The structural parts 034 of the anti-reflection structure 032 may not be of rectangular structures. The aspherical surface may be formed of a multilayer filme combining a thin film if the anti-reflection structure 032 is used.

Figure 7:
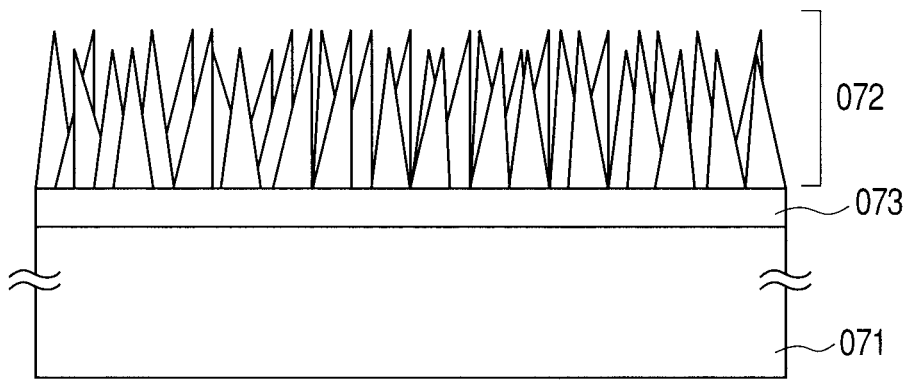
FIG. 7 is a schematic view of another example of an anti-reflection structure with a structure finer than a used wavelength.

FIG. 7 is an explanatory diagram of another example of this embodiment. Referring to FIG. 7, a substrate made of an optical glass is represented by 071, an anti-reflection structure is represented by 072, and a thin film is represented by 073. The average pitch of the structural parts of the anti-reflection structure 072 is equal to or lower than a used wavelength. Even if the anti-reflection structure 072 is varied in density in the thickness direction, there arises no problem. A structure in which the density is varied in the thickness direction as in the anti-reflection structure 072 is equivalent to a filme whose refractive index is gradually varied from air toward the substrate 071. The thin film 073 is disposed between the anti-reflection structure 072 and the substrate 071. As a result, higher anti-reflection performance is obtained.

In this embodiment, the anti-reflection structure is made of an inorganic material. When the anti-reflection structure 032 is used, the surface area is increased as compared with the conventional anti-reflection film. An increase in the surface area of a material low in water resistance and light resistance, which is represented by a resin is not preferable because the environment resistance is remarkably deteriorated. For that reason, such an anti-reflection structure 032 is made of an inorganic material to obtain the anti-reflection performance excellent in the environment resistance. According to this embodiment, the optical system 011 has the angle of field (imaging angle of field) 2ω satisfying 80 degrees<2ω. The angle of field 2ω is represented by the following expression.

$$\omega = \tan^{-1}\left(\frac{\text{screen diagonal length}}{2 \cdot \text{focal length}}\right) \quad (4)$$

When the angle of field (imaging angle of field) 2ω is large, an incident angle of light incident on each lens surface of the optical system 011 becomes large. When such light is reflected from the lens surface to serve as ghost, because an incident angle of light on the lens surface on which the ghost occurs is large, the reflectance is liable to be high. As a result, the intensity of the ghost becomes high, and the ghost is conspicuous as an image, which is not preferable. With the provision of the anti-reflection structure 032 to such a lens surface, because the reflectance of light large in incident angle can be suppressed, the ghost can be effectively suppressed. When the angle of field 2ω of the optical system satisfies 90 degrees<2ω, and further satisfies 100 degrees<2ω, the proposition is clarified, and the ghost can be more effectively suppressed by application of the anti-reflection structure of this embodiment.

The optical system 011 according to this embodiment is 118.7 degrees in the angle of field, which satisfies Expression (4). For that reason, light large in the incident angle is liable to be incident on the aspherical surface 013, and the intensity of ghost is liable to increase. Under the circumstance, the reflection of obliquely incident light can be highly suppressed by provision of the anti-reflection structure 032 to the aspherical surface 013, and hence the ghost can be effectively suppressed.

Figure 4:
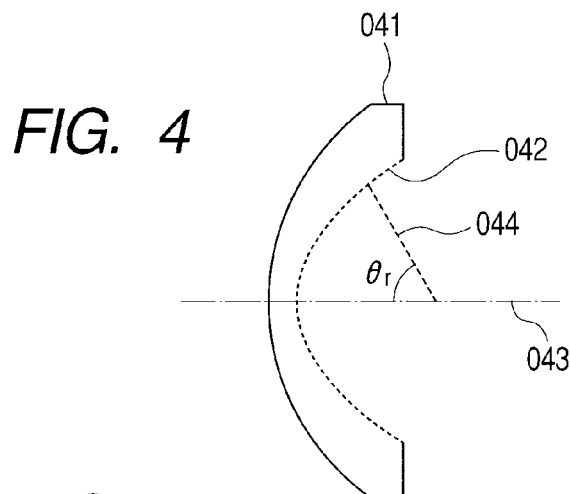
FIG. 4 is an image view of a half aperture angle θr in the aspherical lens.

In this embodiment, the maximum half aperture angle of the aspherical surface 013 is 30 degrees of higher. FIG. 4 is an image view of the half aperture angle θr of the lens surface. In FIG. 4, an aspherical lens is represented by 041, a cross section of the aspherical surface is represented by 042, an optical axis of the aspherical lens 041 is represented by 043, and a surface normal of the aspherical surface 042 is represented by 044. The half aperture angle θr is an angle formed by the surface normal 044 of the aspherical surface 042 and the optical axis 043. Because the surface normal 044 is different depending on the location in the aspherical surface 042, the half aperture angle θr is different depending on the location in the aspherical surface 042. In the present invention, the maximum half aperture angle θr in the aspherical surface 042 is 30 degrees or higher.

In the case of the aspherical surface having the maximum half aperture angle of 30 degrees or higher, when attempt is made to provide the anti-reflection film through the conventional vacuum film forming method, a difference in thickness between the center of the lens and the periphery of the lens occurs. The ghost light is frequently obliquely incident on the surface high in half aperture angle, and it is difficult for the conventional anti-reflection film to remove the ghost. In this embodiment, because the reflection when the half aperture angle is large can be also suppressed by provision of the anti-reflection structure 032 to such an aspherical surface, the ghost can be effectively suppressed. Further, when the maximum half aperture angle is 40 degrees or higher, further 45 degrees or higher, the effect becomes clearer. With application of the anti-reflection structure of this embodiment to such an aspherical surface, the ghost can be more effectively suppressed.

The maximum half aperture angle of the aspherical surface 013 illustrated in FIG. 1 is 53.4 degrees and is 30 degrees or higher. For that reason, when the anti-reflection structure 032 is provided to the aspherical surface 013, because the reflection when the half aperture angle is large can be also suppressed, the ghost can be effectively suppressed.

In the optical system according to this embodiment, the above-mentioned aspherical surface 013 is located on the object side of the aperture stop SP. Light is liable to be incident on the lens located on the object side of the aperture stop SP at the obliquely incident angle larger than that of the lens located on the image side. Further, the incident angle of ghost is liable to be large, thereby requiring the anti-reflection film with lower reflection. In this embodiment, with application of the anti-reflection structure 032 to such a lens surface, the reflection of the obliquely incident light can be suppressed, and the ghost can be effectively suppressed.

The spherical surface 013 is located on the object side of the aperture stop SP. For that reason, when the anti-reflection structure 032 is provided to the aspherical surface 013, because the reflection of light high in incident angle is suppressed, the ghost can be prevented from being conspicuous. In this embodiment, the above-mentioned aspherical surface can satisfy the following Expression (5).

$$|Rm/Rs| > 1.05 \quad (5)$$

Expression (5) represents that a ratio of the radius of curvature Rm in the meridional direction to the radius of curvature Rs in the sagittal direction is large. When the conditional expression (5) is met, the risk that ghost becomes heteromorphous becomes higher as compared with the case where Expression (2) is met.

Expression (5) includes a case in which a sign of the radius of curvature Rm in the meridional direction is reversed, that is, an inflection point exists on the aspherical surface. When such a surface becomes a ghost occurrence surface, light changes whether to diverge or converge depending on the incident position. For that reason, such a surface is further liable to become a generation source of the heteromorphous ghost. In this embodiment, with application of the anti-reflection structure 032 to such a surface, because the reflection of light on the surface is suppressed, the ghost can be effectively suppressed.

The effect is more clarified when a value on a right-hand side of Expression (5) is preferably 1.1 or higher, further 1.15 or higher. When the anti-reflection structure according to this embodiment is applied to such a surface, the ghost can be more effectively suppressed. In this embodiment, the aspherical surface 013 is 100 or higher in the value on a left-hand side of Expression (5). For that reason, the ghost light incident on the aspherical surface 013 is liable to a generation source of the more heteromorphous ghost. With application of the anti-reflection structure 032 to the aspherical surface 013, the intensity of ghost can be weakened, and the ghost can be more effectively suppressed.

Second Embodiment

Figure 5:
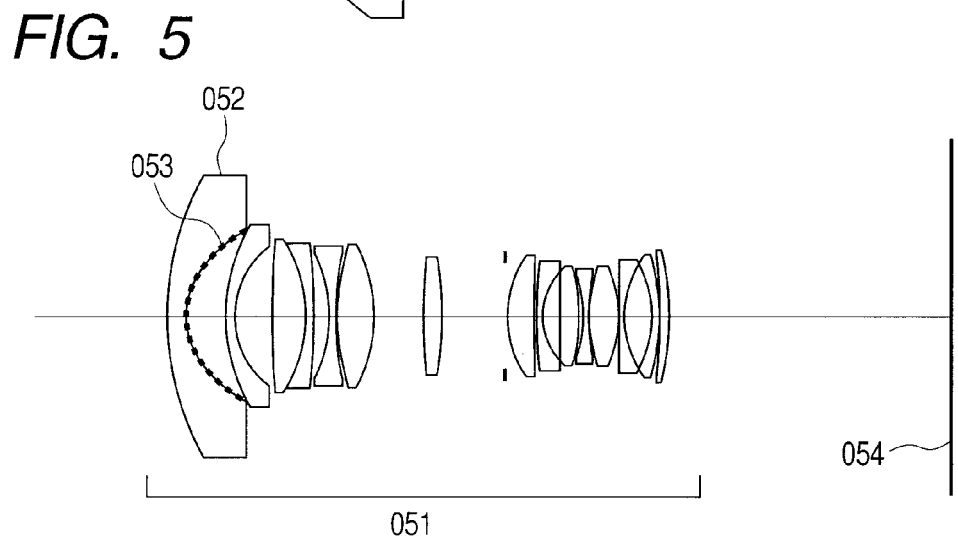
FIG. 5 is a cross-sectional view of lenses in an optical system according to a second embodiment of the present invention.

FIG. 5 is a cross-sectional view of lenses in an optical system according to a second embodiment of the present invention. In the figure, an image pickup optical system is represented by 051, an aspherical lens is represented by 052, an aspherical surface is represented by 053, and an imaging plane is represented by 054. In this embodiment, an image side surface of a first lens from the object side is the aspherical surface 053. The aspherical surface 053 is provided with an anti-reflection structure formed of structural parts made of an inorganic material and finer than the used wavelength. A second numerical embodiment of the second embodiment is shown in Table 2 like the first numerical embodiment.

In this embodiment, the aspherical surface 053 is $7.9 \times 10^{-4}$ in the value on the left-hand side of Expression (2), which satisfies the condition of Expression (2). For that reason, ghost occurring on the aspherical surface 053 is liable to be a heteromorphous image. Under the circumstance, when the anti-reflection structure 032 is provided to the aspherical surface 053, the ghost can be effectively suppressed. In this embodiment, the angle of field 2ω of the optical system 051 is 100.24 degrees, which satisfies Expression (4). For that reason, light large in incident angle is liable to be incident on the aspherical surface 053, and the intensity of ghost is liable to increase. Under the circumstance, when the anti-reflection structure 032 is provided to the aspherical surface 053, because reflection of the obliquely incident light is suppressed, the ghost can be effectively suppressed.

Further, the maximum half aperture angle of the aspherical surface 053 is 59.4 degrees, which are 30 degrees or higher. For that reason, when the anti-reflection structure 032 is provided to the aspherical surface 053, because reflection when the aperture angle is acute is also suppressed, the ghost can be effectively suppressed. The aspherical surface 053 is about 1.9 in the value on the left-hand side of Expression (5), which satisfies Expression (5). For that reason, with application of the anti-reflection structure 032 to the aspherical surface 053, the intensity of ghost can be weakened, and the ghost can be more effectively suppressed.

Third Embodiment

Figure 6:
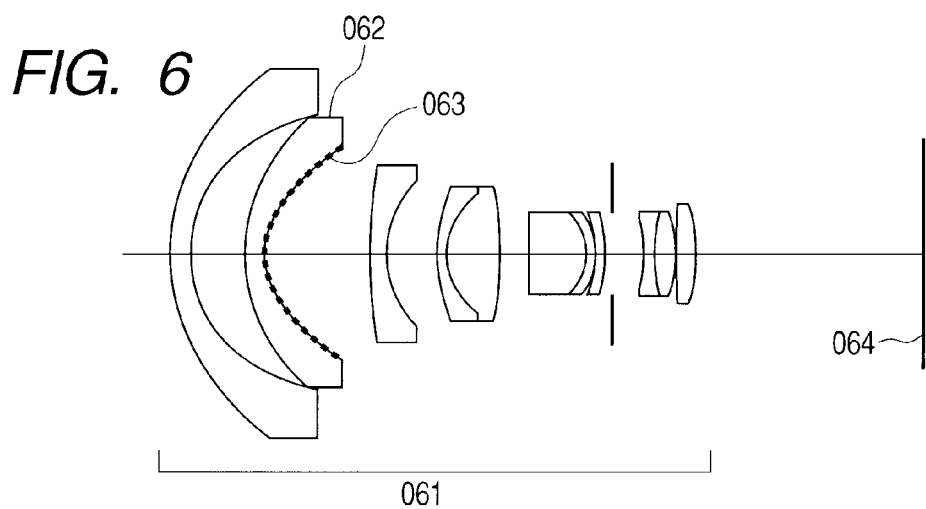
FIG. 6 is a cross-sectional view of lenses in an optical system according to a third embodiment of the present invention.

FIG. 6 is a cross-sectional view of lenses in an optical system according to a third embodiment of the present invention. In the figure, an image pickup optical system is represented by 061, an aspherical lens is represented by 062, an aspherical surface is represented by 063, and an imaging plane is represented by 064. In this embodiment, an image side surface of a second lens from the object side is the aspherical surface 063. The aspherical surface 063 is provided with an anti-reflection structure formed of structural parts made of an inorganic material and finer than the used wavelength. A third numerical embodiment of the third embodiment is shown in Table 3 like the first numerical embodiment. The aspherical surface 063 is $8.4 \times 10^{-1}$ in the value on the left-hand side of Expression (2), which satisfies the condition of Expression (2). For that reason, ghost occurring on the aspherical surface 063 is liable to be a heteromorphous image. Under the circumstance, when the anti-reflection structure 032 is provided to the aspherical surface 063, the ghost can be effectively suppressed.

In this embodiment, the angle of field 2ω of the optical system 061 is 111.30 degrees, which satisfies Expression (4). For that reason, light large in incident angle is liable to be incident on the aspherical surface 063, and the intensity of ghost is liable to increase. Under the circumstance, when the anti-reflection structure 032 is provided to the aspherical surface 063, because reflection of the obliquely incident light is suppressed, the ghost can be effectively suppressed. Further, the maximum half aperture angle of the aspherical surface 063 is 46.5 degrees which are 30 degrees or higher. For that reason, when the anti-reflection structure 032 is provided to the aspherical surface 063, because reflection when the aperture angle is acute is also suppressed, the ghost can be effectively suppressed. The aspherical surface 063 is more or equal to 100 in the value on the left-hand side of Expression (5), which satisfies Expression (5). For that reason, with application of the anti-reflection structure 032 to the aspherical surface 063, the intensity of ghost can be weakened, and the ghost can be more effectively suppressed. As has been described above, according to the respective embodiments, the optical system excellent in imaging performance and reduced in the heteromorphic image can be achieved.

Figure 8:
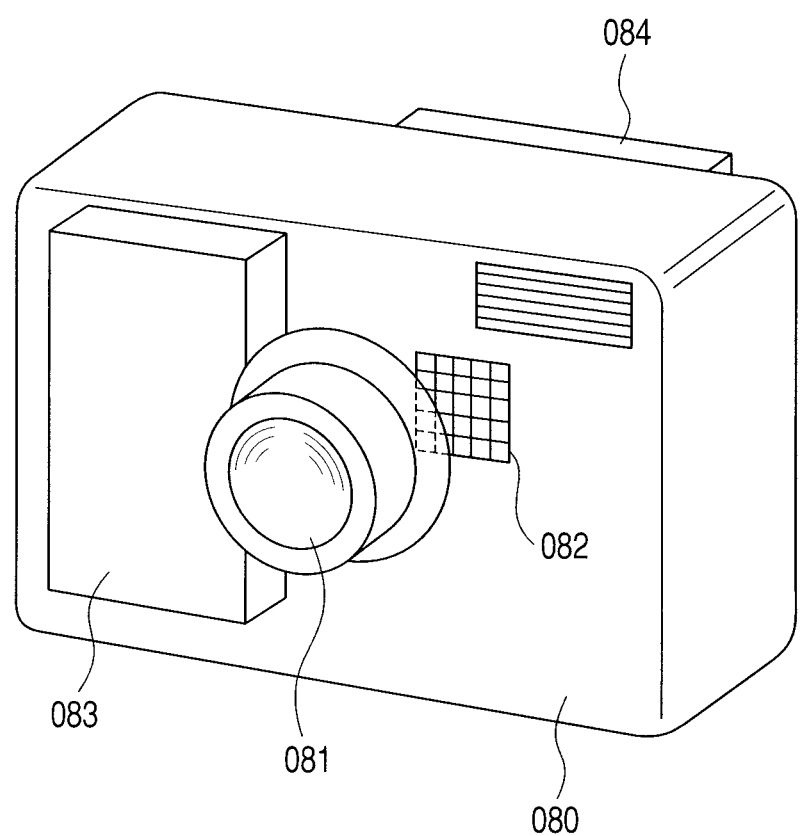
FIG. 8 is a schematic view of a digital camera applying this embodiment.

The optical systems according to the first to third embodiments are available to a large number of optical equipments. For example, FIG. 8 illustrates a digital camera as an example of an optical equipment using the optical systems of the respective embodiments. A camera body is represented by 080, an image pickup optical system using this embodiment is represented by 081. A solid-state image pickup element (photoelectric conversion element) is represented by 082, such as a CCD sensor or a CMOS sensor which receives light of an image to be taken which has been formed by the image pickup optical system 081. A memory is represented by 083 that records information corresponding to the image to be taken which has been subjected to photoelectric conversion by the image pickup element 082. An electronic view finder is represented by 084, which is made up of a liquid crystal display panel or the like, for observing the image to be taken which has been formed on the solid-state image pickup element 082.

With use of the image pickup optical systems according to the respective embodiments as described above, a camera (image pickup device) having a high optical performance, which suppresses unnecessary reflection within the image pickup optical system can be realized. The optical systems according to the respective embodiments can be also used in an illumination optical system or a projection optical system for liquid crystal projectors. With the configuration of the optical system as described above, there can be provided the optical equipment excellent in imaging performance and suppressing the unnecessary ghost. The exemplary embodiments of the present invention have been described above, but the present invention is not limited to those embodiments, and can be variously modified or altered without departing from the subject matter of the invention.

TABLE 1

Numerical embodiment 1
f = 17.30 Fno = 4.08 2ω = 118.7° Image height 29.20

Surface data

| Surface number | r | d | nd | vd |
|---|---|---|---|---|
| 1 | 39.032 | 3.50 | 1.78472 | 25.7 |
| 2 | 27.725 | 6.93 | | |
| 3 | 31.865 | 3.50 | 1.58313 | 59.4 |
| 4* | 13.517 | 13.14 | | |
| 5 | 91.868 | 2.20 | 1.49700 | 81.5 |
| 6 | 15.964 | 7.78 | | |
| 7 | 107.797 | 7.29 | 1.65412 | 39.7 |
| 8 | −19.345 | 1.40 | 1.83481 | 42.7 |
| 9 | 35.295 | 1.50 | | |
| 10 | 44.257 | 6.95 | 1.65412 | 39.7 |
| 11 | −13.418 | 1.00 | 1.77250 | 49.6 |
| 12 | −62.398 | (Variable) | | |
| 13 | 48.270 | 8.00 | 1.74950 | 35.3 |
| 14 | −73.913 | (Variable) | | |
| 15 (Stop) | ∞ | 0.50 | | |
| 16 | 33.082 | 2.88 | 1.59270 | 35.3 |
| 17 | −68.298 | 0.70 | | |
| 18 | −159.710 | 1.00 | 1.83400 | 37.2 |
| 19 | 13.505 | 4.58 | 1.56732 | 42.8 |
| 20 | −20.235 | 1.15 | | |
| 21 | −15.707 | 1.00 | 1.83400 | 37.2 |
| 22 | 92.413 | 0.15 | | |
| 23 | 37.208 | 4.78 | 1.49700 | 81.5 |

TABLE 1-continued

Numerical embodiment 1
f = 17.30 Fno = 4.08 2ω = 118.7° Image height 29.20

| | | | | |
|---|---|---|---|---|
| 24 | −17.223 | 0.15 | | |
| 25 | 323.333 | 1.20 | 1.83400 | 37.2 |
| 26 | 20.255 | 7.45 | 1.49700 | 81.5 |
| 27 | −32.065 | 0.15 | | |
| 28 | −1491.679 | 1.75 | 1.80518 | 25.4 |
| 29 | −136.318 | (Variable) | | |

Aspherical surface data
Fourth surface

K = −6.04712e−001  B = 2.34342e−007  C = −5.84547e−008
D = 2.31497e−010  E = −8.25084e−013

TABLE 2

Numerical embodiment 2
f = 24.40 Fno = 3.56 2ω = 100.24° Image height 29.20

Surface data

| Surface number | r | d | nd | νd |
|---|---|---|---|---|
| 1 | ∞ | 1.60 | | |
| 2 | 52.438 | 3.80 | 1.58313 | 59.4 |
| 3* | 13.780 | 7.50 | | |
| 4 | 32.841 | 1.80 | 1.84666 | 23.8 |
| 5 | 17.276 | 7.09 | | |
| 6 | 280.581 | 6.33 | 1.68893 | 31.1 |
| 7 | −26.041 | 1.40 | 1.83400 | 37.2 |
| 8 | −190.133 | 2.93 | | |
| 9 | −27.873 | 1.40 | 1.49700 | 81.5 |
| 10 | 64.649 | 0.16 | | |
| 11 | 45.028 | 6.86 | 1.51633 | 64.1 |
| 12 | −31.077 | (Variable) | | |
| 13 | 114.268 | 3.44 | 1.71736 | 29.5 |
| 14 | −94.694 | (Variable) | | |
| 15 (Stop) | ∞ | 0.05 | | |
| 16 | 19.207 | 5.21 | 1.65412 | 39.7 |
| 17 | 544.261 | 0.50 | | |
| 18 | 92.444 | 1.00 | 1.88300 | 40.8 |
| 19 | 12.142 | 7.13 | 1.51742 | 52.4 |
| 20 | −33.287 | 0.86 | | |
| 21 | −21.599 | 0.90 | 1.83400 | 37.2 |
| 22 | 47.336 | 0.15 | | |
| 23 | 28.073 | 5.47 | 1.49700 | 81.5 |
| 24 | −23.879 | 0.15 | | |
| 25 | 443.582 | 1.10 | 1.88300 | 40.8 |
| 26 | 19.175 | 6.66 | 1.49700 | 81.5 |
| 27 | −40.453 | 0.15 | | |
| 28 | −92.418 | 1.58 | 1.84666 | 23.8 |
| 29 | −57.612 | (Variable) | | |

Aspherical surface data
Third surface

K = −8.32287e−001  B = 1.23299e−005  C = −1.78962e−008
D = 2.37267e−010  E = −7.22792e−013  F = 9.89766e−016

TABLE 3

Numerical embodiment 3
f = 14.33 Fno = 2.89 2ω = 113.0° Image height 21.64

Surface data

| Surface number | r | d | nd | νd |
|---|---|---|---|---|
| 1 | 44.000 | 3.40 | 1.772499 | 49.6 |
| 2 | 26.915 | 9.30 | | |
| 3 | 35.337 | 3.35 | 1.696797 | 55.5 |

TABLE 3-continued

Numerical embodiment 3
f = 14.33 Fno = 2.89 2ω = 113.0° Image height 21.64

| | | | | |
|---|---|---|---|---|
| 4* | 15.123 | 18.20 | | |
| 5 | 119.451 | 2.61 | 1.696797 | 55.5 |
| 6 | 20.354 | 0.40 | 1.516400 | 52.2 |
| 7* | 25.788 | 8.50 | | |
| 8 | 37.975 | 1.50 | 1.834807 | 42.7 |
| 9 | 14.286 | 9.50 | 1.720467 | 34.7 |
| 10 | −51.586 | 4.86 | | |
| 11 | 340.558 | 9.96 | 1.487490 | 70.2 |
| 12 | −10.506 | 1.50 | 1.772499 | 49.6 |
| 13 | −14.236 | 0.15 | | |
| 14 | −18.747 | 1.60 | 1.804000 | 46.6 |
| 15 | −28.924 | 1.53 | | |
| 16 (Stop) | ∞ | 5.10 | | |
| 17 | −33.161 | 1.75 | 1.749500 | 35.3 |
| 18 | 22.876 | 3.88 | 1.496999 | 81.5 |
| 19 | −22.642 | 0.15 | | |
| 20 | 165.912 | 3.48 | 1.569070 | 71.3 |
| 21 | −29.305 | 41.47 | | |

Aspherical surface coefficients
Fourth surface

K = −8.26632e−001  B = −3.02313e−006  C = 1.27000e−008
D = 2.65686e−011  E = −5.24−061e−013  F = 1.58414e−015
G = −2.44104e−018  H = 1.59960e−021

Seventh surface

K = −1.06378e−001  B = 3.19400e−005  C = −1.47462e−007
D = 9.88342e−010  E = 8.80888e−012  F = −1.43421e−013
G = 6.81223e−016  H = −1.14158e−018

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-116313, filed May 13, 2009, which is hereby incorporated by reference herein in its entirety.

What is claimed is:

1. An image pickup optical system, comprising:
an aperture stop; and
  a negative meniscus lens located on an object side of the aperture stop so that a concave surface of the meniscus lens faces to an image side,
wherein:
  the concave surface of the meniscus lens is an aspherical surface;
  an anti-reflection structure formed only on the aspherical surface, the anti-reflection structure including multiple structural parts made of an inorganic material and finer than a used wavelength; and
  the aspherical surface has a point that satisfies the following expression:

$$|(1/Rm - 1/Rs)/Rm| > 5.0 \times 10^{-5} (mm^{-2}),$$

where Rm denotes a radius of curvature in a meridional direction corresponding to a radial direction of the aspherical lens at the point, and Rs denotes a radius of curvature in a sagittal direction corresponding to a concentric direction of the aspherical lens at the point.

2. The image pickup optical system according to claim 1, wherein the aspherical surface has a maximum half aperture angle equal to or higher than 30 degrees.

3. The image pickup optical system according to claim 1, wherein the point satisfies the following expression:

$$|Rm/Rs| > 1.05.$$

4. The image pickup optical system according to claim 1, wherein the aspherical surface has an inflection point on which a sign of the Rm is reversed.

5. An image pickup device, comprising:
an image pickup optical system comprising:
an aperture stop; and
a negative meniscus lens located on an object side of the aperture stop so that a concave surface of the meniscus lens faces to an image side; and
an image pickup element that receives light of an image formed by the image pickup optical system, wherein,
the concave surface of the meniscus lens is an aspherical surface;
an anti-reflection structure formed only on the aspherical surface, the anti-reflection structure including multiple structural parts made of an inorganic material and finer than a used wavelength; and
the aspherical surface has a point that satisfies the following expression:

$|(1/Rm-1/Rs)/Rm|>5.0\times10^{-5}(mm^{-2})$, where Rm denotes a radius of curvature in a meridional direction corresponding to a radial direction of the aspherical lens at the point, and Rs denotes a radius of curvature in a sagittal direction corresponding to a concentric direction of the aspherical lens at the point.

6. The image pickup device according to claim 5, wherein the following expression is satisfied:
80 degrees $<2\omega$,
where $2\omega$ denotes an imaging angle of field of the image pickup optical system.

7. The image pickup device according to claim 6, wherein the aspherical surface has a maximum half aperture angle equal to or higher than 30 degrees.

8. The image pickup device according to claim 7, wherein the point satisfies the following expression:

$|Rm/Rs|>1.05$.

9. An optical device, comprising:
a device body; and
an image pickup optical system connected to the device body, the image pickup optical system comprising:
an aperture stop; and
a negative meniscus lens located on an object side of the aperture stop so that a concave surface of the meniscus lens faces to an image side, wherein:
the concave surface of the meniscus lens is an aspherical surface;
an anti-reflection structure formed only on the aspherical surface, the anti-reflection structure including multiple structural parts made of an inorganic material and finer than a used wavelength; and
the aspherical surface has a point that satisfies the following expression:

$|(1/Rm-1/Rs)/Rm|>5.0\times10^{-5}(mm^{-2})$, where Rm denotes a radius of curvature in a meridional direction corresponding to a radial direction of the aspherical lens at the point, and Rs denotes a radius of curvature in a sagittal direction corresponding to a concentric direction of the aspherical lens at the point.

* * * * *